(12) United States Patent
Suzuki

(10) Patent No.: US 7,519,482 B2
(45) Date of Patent: Apr. 14, 2009

(54) MULTI-VARIABLE MASS/FLOW RATE TRANSFER DEVICE

(75) Inventor: Yoshihide Suzuki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 82 days.

(21) Appl. No.: 11/706,080

(22) Filed: Feb. 12, 2007

(65) Prior Publication Data

US 2007/0192054 A1 Aug. 16, 2007

(30) Foreign Application Priority Data

Feb. 14, 2006 (JP) .............................. 2006-035883

(51) Int. Cl.
*G01F 1/00* (2006.01)
*G06F 19/00* (2006.01)

(52) U.S. Cl. ....................................................... 702/45

(58) Field of Classification Search .................. 702/45, 702/47, 50, 100, 127; 73/861, 861.01, 861.02, 73/861.03; 700/281, 282, 296
See application file for complete search history.

(56) References Cited

U.S. PATENT DOCUMENTS 4,936,508 A * 6/1990 Ingalz ........................ 239/72
4,949,276 A * 8/1990 Staroselsky et al. ......... 700/282
2004/0078117 A1 * 4/2004 Vanderah et al. ............ 700/301

FOREIGN PATENT DOCUMENTS

| JP | 2003-57098 | 2/2003 |
| JP | 2005-190461 | 7/2005 |

* cited by examiner

*Primary Examiner*—Bryan Bui
(74) *Attorney, Agent, or Firm*—Edwards Angell Palmer & Dodge LLP

(57) ABSTRACT

A multi-variable mass/flow rate transfer device is provided with: a differential pressure/static pressure/temperature calculating unit for calculating a differential pressure value, a static pressure value, and a temperature value in real time based upon a signal detected from a process; an instantaneous flow rate calculating unit for calculating an instantaneous flow rate based upon the differential pressure value, the static pressure value, and the temperature value; an accumulation counter for accumulating the calculated instantaneous flow rate of the instantaneous flow rate calculating unit so as to produce an accumulated flow rate; and an accumulated flow rate alarm unit for producing an alarm when the accumulated flow rate produced by the accumulation counter becomes a predetermined value.

5 Claims, 4 Drawing Sheets

MULTI-VARIABLE MASS/FLOW RATE TRANSFER DEVICE

BACKGROUND OF THE INVENTION

1. Field of the Invention

The present invention is related to a multi-variable mass/flow rate transfer device (multiple variable transfer device) in which a plurality of physical signals (differential pressure signal, static pressure signal, and temperature signal) detected from a process are inputted so as to calculate mass and a flow rate by a microprocessor; the calculated mass/flow rate are outputted as, for instance, analog current signals of 4 to 20 mA to a 2-wire type transfer line, or is directed to a multi-variable mass/flow rate transfer device having communication means operated based upon a protocol as to a communication standard, which outputs digital information such as a calculation process result to a field bus.

2. Description of the Related Art

FIG. 3 is a structural diagram for indicating a conventional multi-variable mass/flow rate transfer device 10' (refer to patent publication 1).

A differential pressure/static pressure/temperature calculating unit 11 calculates a differential pressure value, a static pressure value, and a temperature value in real time based upon signals which are detected from a process and are entered thereto. Furthermore, a differential pressure/static pressure/temperature output unit 14 is connected to an output of the differential pressure/static pressure/temperature calculating unit 11 so as to output the differential pressure value, the static pressure value, and the temperature value, which are transferred to an external unit (not shown), respectively.

Further, an instantaneous flow rate calculating unit 12 is connected to an output of the differential pressure/static pressure/temperature calculating unit 11 so as to calculate an instantaneous flow rate in real time from the differential pressure value, the static pressure value, and the temperature value. Furthermore, an instantaneous flow rate output unit 13 is connected to the output of the instantaneous flow rate calculating unit 12 so as to output the value of the calculated instantaneous flow rate, which is transferred to the external unit.

In addition, an instantaneous flow rate alarm unit 17 is connected to the output of the instantaneous flow rate calculating unit 12, and when an instantaneous flow rate value becomes a predetermined value, the instantaneous flow rate alarm unit 17 produces an alarm, and this alarm is transferred to the external unit. Further, a differential pressure/static pressure/temperature alarm unit 18 is connected to the differential pressure/static pressure/temperature calculating unit 11. When a differential pressure value becomes a predetermined value, the differential pressure/static pressure/temperature alarm unit 18 produces an alarm; when a static pressure value becomes a predetermined value, the differential pressure/static pressure/temperature alarm unit 18 produces an alarm; and when a temperature value becomes a predetermined value, the differential pressure/static pressure/temperature alarm unit 18 produces an alarm, and then, these alarms are transferred to the external unit.

FIG. 4 is a characteristic diagram for representing a threshold value of an instantaneous flow rate alarm unit 17 of the conventional multi-variable mass/flow rate transfer device 10' of FIG. 3. An abscissa of the characteristic diagram indicates time, whereas an ordinate thereof shows an accumulated value of instantaneous flow rates which are produced by the instantaneous flow rate calculating unit 12.

In the drawing, while a characteristic "F1" corresponds to a characteristic in the case that an instantaneous flow rate "A" is substantially constant, both an elapsed time "t" and an accumulated flow rate "S" are directly proportional to each other, and satisfy the below-mentioned formula (1).

$$S = A \cdot t \tag{1}$$

Further, another characteristic "F2" is such a characteristic that when an instantaneous flow rate "A" is substantially constant, and is equal to an upper limit "+a" of a flow rate precision percentage ±a [%], both an elapsed time "t" and an accumulated flow rate "S" become a direct proportional relationship, an inclination is increased, and satisfy the below-mentioned formula (2).

$$S = A \cdot t \cdot ((100+a)/100) \tag{2}$$

Further, a characteristic "F3" is such a characteristic that when an instantaneous flow rate "A" is substantially constant, and is equal to a lower limit "−a" of the flow rate precision percentage ±a [%], both an elapsed time "t" and an accumulated flow rate "S" become a direct proportional relationship, an inclination is decreased, and satisfy as below-mentioned formula (3).

$$S = A \cdot t \cdot ((100-a)/100) \tag{3}$$

Then, when the instantaneous flow rate "A" becomes larger than the upper limit "+a", the instantaneous flow rate alarm unit 17 produces an alarm, whereas when the instantaneous flow rate "A" becomes smaller than the lower limit "−a", the instantaneous flow rate alarm unit 17 produces an alarm.

Further, when the instantaneous flow rate "A" is substantially constant and is equal to the flow rate precision percentage ±a [%], at a time instant "T1", there are some possibilities that the instantaneous flow rate "A" is varied from an accumulated flow rate "S3" (=A·t·((100−T1)/100) up to another accumulated flow rate "S2" (=A·t·((100+T1)/100).

[Patent publication 1] JP-A-2005-190461
[Patent publication 2] JP-A-2003-57098

However, in the conventional technical idea of FIG. 3 and FIG. 4, there is a problem such that when the elapsed time "t" is increased, a difference (A·t·((100+2·a)/100) between the accumulated flow rate S2 and the accumulated flow rate S3 is increased. Concretely speaking, if the elapsed time "t" is increased two times; then the difference between the accumulated flow rate S2 and the accumulated flow rate S3 is also increased twice.

As a consequence, the following problem occurs: That is, it is not possible to set in high precision as to whether or not an accumulated flow rate is appropriate based upon the threshold value of the instantaneous flow rate alarm unit 17.

SUMMARY OF THE INVENTION

An object of the present invention is to solve the above-explained problems, and is to provide a multi-variable mass/flow rate transfer device capable of judging as to whether or not an accumulated flow rate of instantaneous accumulated flow rates is appropriate. Further, the present invention is to provide a multi-variable mass/flow rate transfer device which is suitably used in food processing steps, high performance industrial furnaces, oil refining systems, or clean room development.

The present invention capable of achieving such objects is given as follows.

There is provided a multi-variable mass/flow rate transfer device including:

a differential pressure/static pressure/temperature calculating unit for calculating a differential pressure value, a static pressure value and a temperature value in real time based upon a signal detected from a process;

an instantaneous flow rate calculating unit for calculating an instantaneous flow rate based upon the differential pressure value, the static pressure value and the temperature value;

an accumulation counter for accumulating the calculated instantaneous flow rate of the instantaneous flow rate calculating unit to produce an accumulated flow rate; and an accumulated flow rate alarm unit for producing an alarm when the accumulated flow rate produced by the accumulation counter becomes a predetermined value.

Both an upper limit threshold value (S1) and a lower limit threshold value (S2) of the accumulated flow rate alarm unit may satisfy the below-mentioned formulae with respect to the instantaneous flow rate (A), a flow rate precision percentage (±a [%]), an error (±B) of the accumulated flow rate and an elapsed time (t):

$$S1 = A \cdot t \cdot ((100+a)/100) + B,$$

$$S2 = A \cdot t \cdot ((100-a)/100) - B.$$

The multi-variable mass/flow rate transfer device may be employed in a food processing step.

The multi-variable mass/flow rate transfer device may be employed in a high performance industrial furnace.

The multi-variable mass/flow rate transfer device may be employed in clean room development.

Both the flow rate precision percentage (±a [%]) and the error (±B) of the accumulated flow rate may be set by way of an external communication setting tool.

In accordance with the present invention, the below-mentioned effects can be achieved.

According to the present invention, it is possible to provide the multi-variable mass/flow rate transfer device capable of judging as to whether or not the accumulated flow rate of the instantaneous accumulated flow rates is appropriate. Further, according to the present invention, it is possible to provide the multi-variable mass/flow rate transfer device which is suitably used in the food processing steps, the high performance industrial furnaces, the oil refining systems, or the clean room development.

DETAILED DESCRIPTION OF EXEMPLARY EMBODIMENTS

Figure 1:
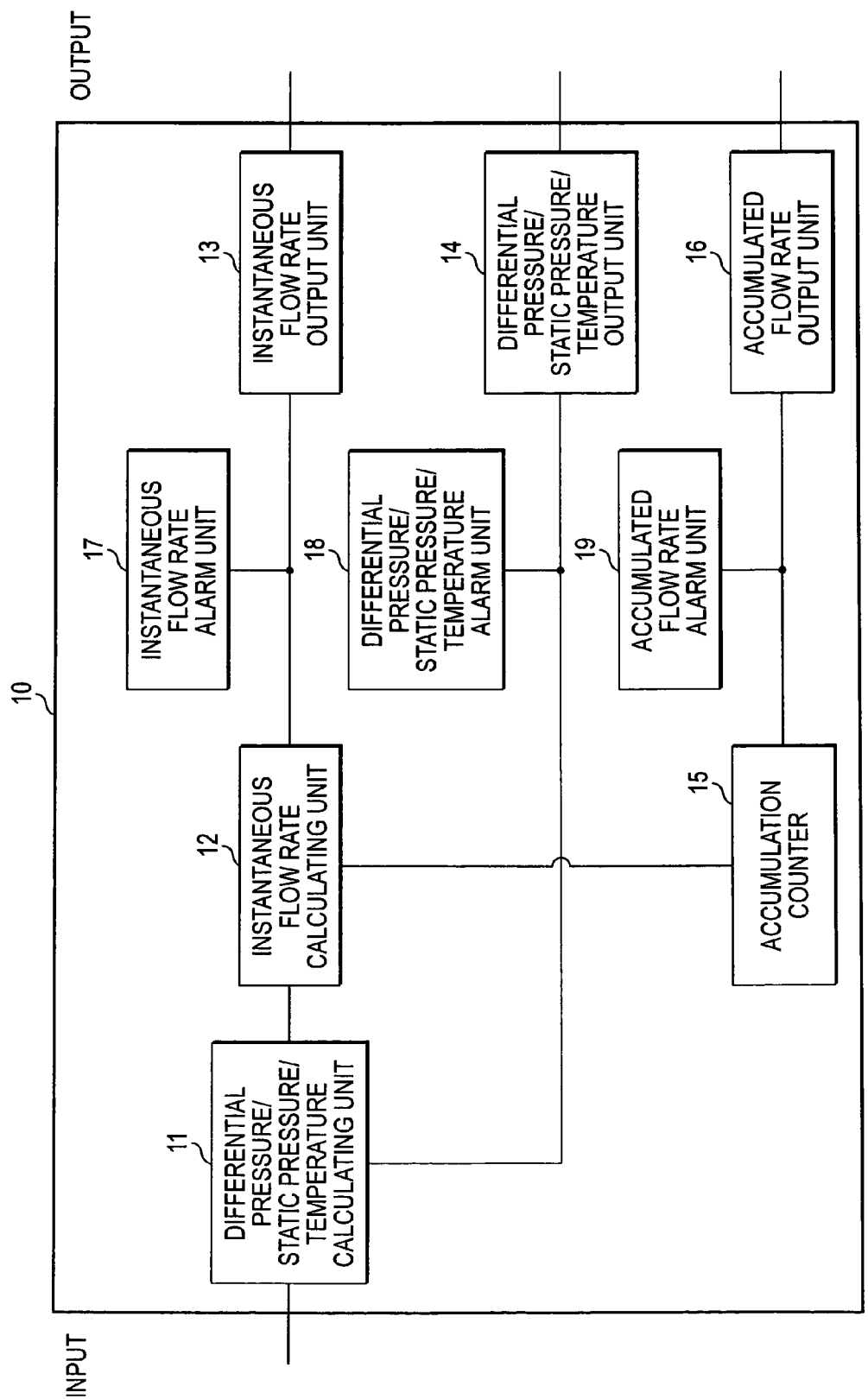
FIG. 1 is a structural diagram for indicating a multi-variable mass/flow rate transfer device according to an embodiment of the present invention.

Referring now to FIG. 1, the present invention will be described in detail. FIG. 1 is a structural diagram for indicating a multi-variable mass/flow rate transfer device according to an embodiment of the present invention. It should be noted that the same reference numerals shown in the conventional technique will be employed as those for denoting the same, or similar structural elements indicated in FIG. 1, and explanations thereof are omitted.

An accumulation counter 15 is connected to an instantaneous flow rate calculating unit 12 so as to accumulate an output of the instantaneous flow rate calculating unit 12. Further, an accumulated flow rate output unit 16 is connected to an output of the accumulator counter 15 so as to output an accumulated flow rate which is transferred to an external unit (not shown).

An accumulated flow rate alarm unit 19 is connected to an output of the accumulator counter 15. When the output value (namely, accumulated flow rate) of the accumulation counter 15 becomes a predetermined value, the accumulated flow rate alarm unit 19 produces an alarm which is transferred to the external unit.

Further, in the accumulated flow rate alarm unit 19, a threshold value S1 of an upper limit is determined in such a manner that this threshold value S1 can satisfy the below-mentioned formula (4). It is so assumed that an accumulated flow rate is "S", an instantaneous flow rate is "A", an elapsed time is "t", a flow rate precision percentage is ±a [%], and an error of the accumulated flow rate is ±B.

$$S1 = A \cdot t \cdot ((100+a)/100) + B \tag{4}$$

Further, in the accumulated flow rate alarm unit 19, a threshold value S2 of a lower limit is determined in such a manner that this threshold value S2 can satisfy the below-mentioned formula (5).

$$S2 = A \cdot t \cdot ((100-a)/100) - B \tag{5}$$

Figure 2:
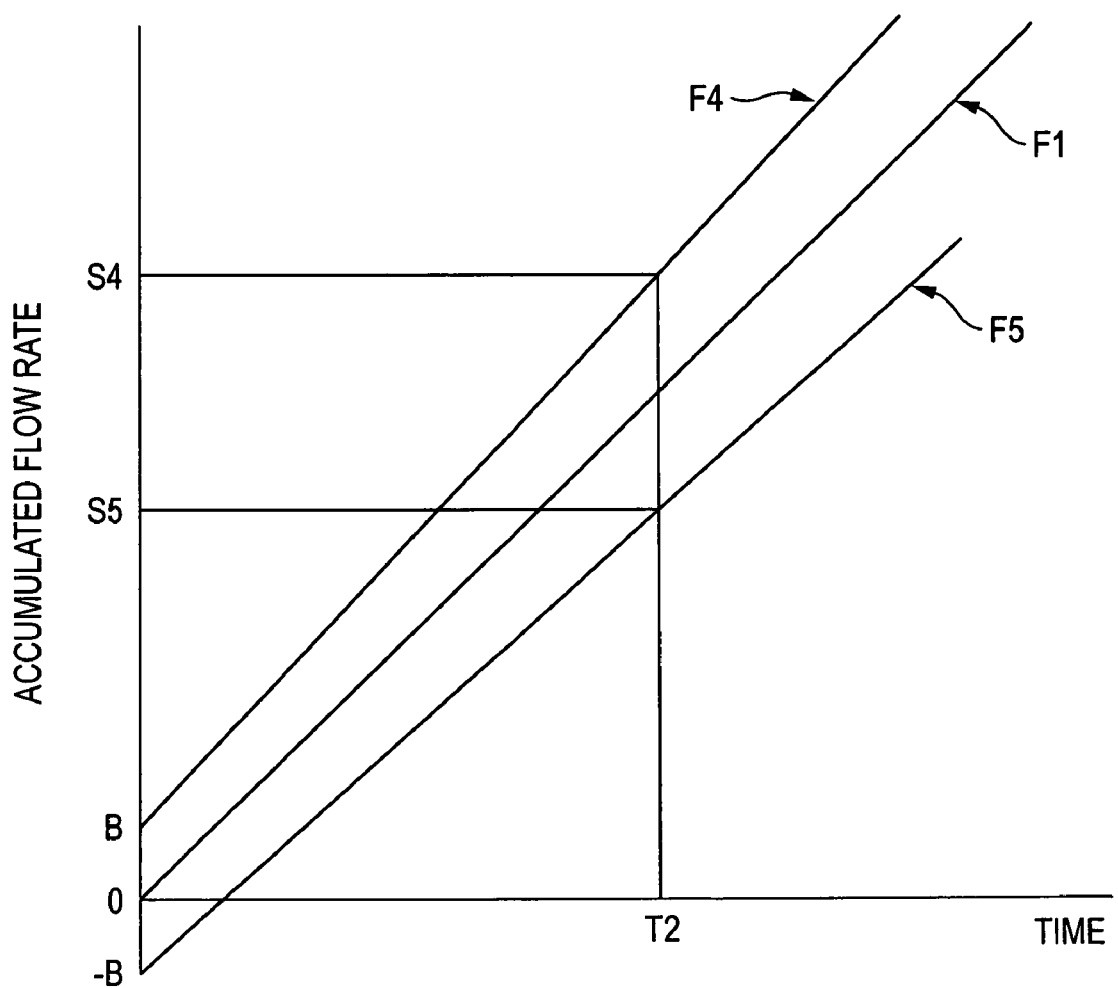
FIG. 2 is a characteristic diagram for indicating threshold values of an accumulated flow rate alarm unit 19 of the embodiment shown in FIG. 1.
Figure 4:
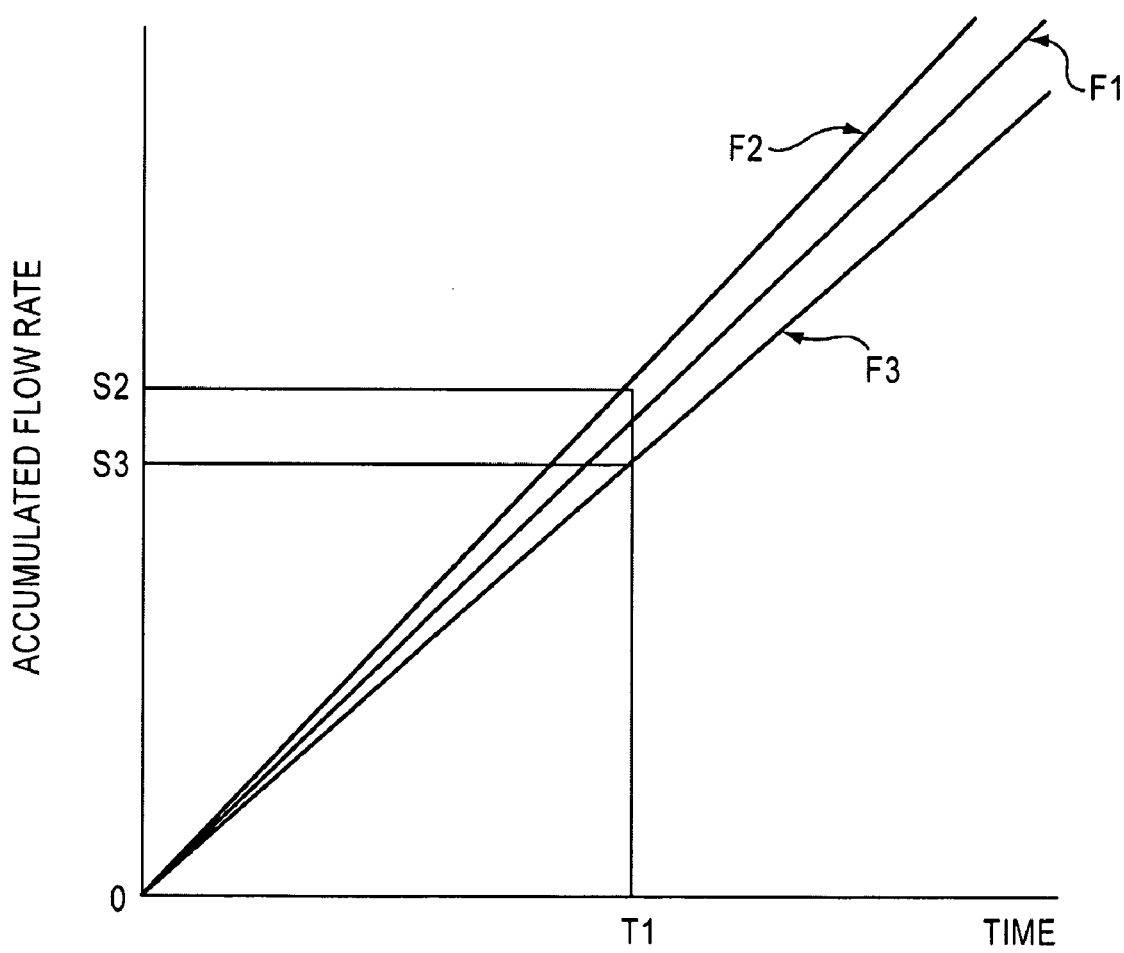
FIG. 4 is the characteristic diagram for indicating the threshold values of the accumulated flow rate alarm unit 17 of the conventional technique shown in FIG. 3.

FIG. 2 is a characteristic diagram for indicating the threshold values of the accumulated flow rate alarm unit 19 of the embodiment shown in FIG. 1. It should also be noted that the same reference numerals shown in the characteristic diagram of FIG. 4 will be employed as those for indicating the same elements indicated in FIG. 2, and explanations thereof are omitted.

In this drawing, a characteristic "F4" corresponds to a characteristic such that the instantaneous flow rate "A" is substantially constant, is equal to an upper limit "+a" of the flow rate precision percentage ±a[%], and is equal to an upper limit "+B" of the accumulated flow rate error ±B and also is related to the above-described formula (4).

Further, a characteristic "F5" corresponds to such a characteristic that the instantaneous flow rate "A" is substantially constant, is equal to a lower limit "−a" of the flow rate precision percentage ±a [%], and is equal to a lower limit "−B" of the accumulated flow rate error ±B, and also is related to the above-described formula (5).

Then, when the accumulated flow rate "S" becomes larger than the upper limit value "S1", the accumulated flow rate alarm unit 19 produces an alarm, whereas when the accumulated flow rate "S" becomes smaller than the lower limit value "S2", the accumulated flow rate alarm unit 19 produces an alarm.

Moreover, when the instantaneous flow rate "A" is substantially constant, is equal to the flow rate precision percentage ±a [%], and also is equal to the error ±B of the accumulated flow rate, at a time instant "T2", there are some possibilities that the accumulated amount is varied from an accumulated flow rate "S4" up to another accumulated flow rate "S5." It should also be noted that both the accumulated flow rate S4 and the accumulated flow rate S5 satisfy both the formulae (6) and (7):

$$S4 = A \cdot T2 \cdot ((100+a)/100) + B \tag{6}$$

$$S5 = A \cdot T2 \cdot ((100-a)/100) - B \tag{7}$$

Then, a difference "ΔS45" between the accumulated flow rate "S4" and the accumulated flow rate "S5" satisfy the below-mentioned formula (8):

$$\Delta S45 = A \cdot T2 \cdot ((100+2 \cdot a)/100) + 2 \cdot B \tag{8}$$

As a consequence, even when the elapsed time "t" is changed, a change of the difference ΔS45 is small. Even if the elapsed time 37 t" is increased two times, then the difference ΔS45 is not increased twice, so that a variation of the difference ΔS45 is small. As a consequence, the multi-variable mass/flow rate transfer device 10 of the embodiment shown in FIG. 1 can judge as to whether or not an accumulated flow rate of an instantaneous accumulated flow rates is appropriate.

Further, when the multi-variable mass/flow rate transfer device 10 according to the embodiment of FIG. 1 is employed in such a system that a value of an accumulated flow rate is large, for example, is used in food processing steps, high performance industrial furnaces, oil refining systems, or clean room development, this multi-variable mass/flow rate transfer device 10 may be suitably operated.

Precisely speaking, a value of an accumulated flow rate is determined based upon an error ±B of an initial accumulated flow rate, and a flow rate error (A·t·a/100). As a consequence, even when the value of the accumulated flow rate is large, the accumulated flow rate may be simply made coincident with a target flow rate.

Figure 3:
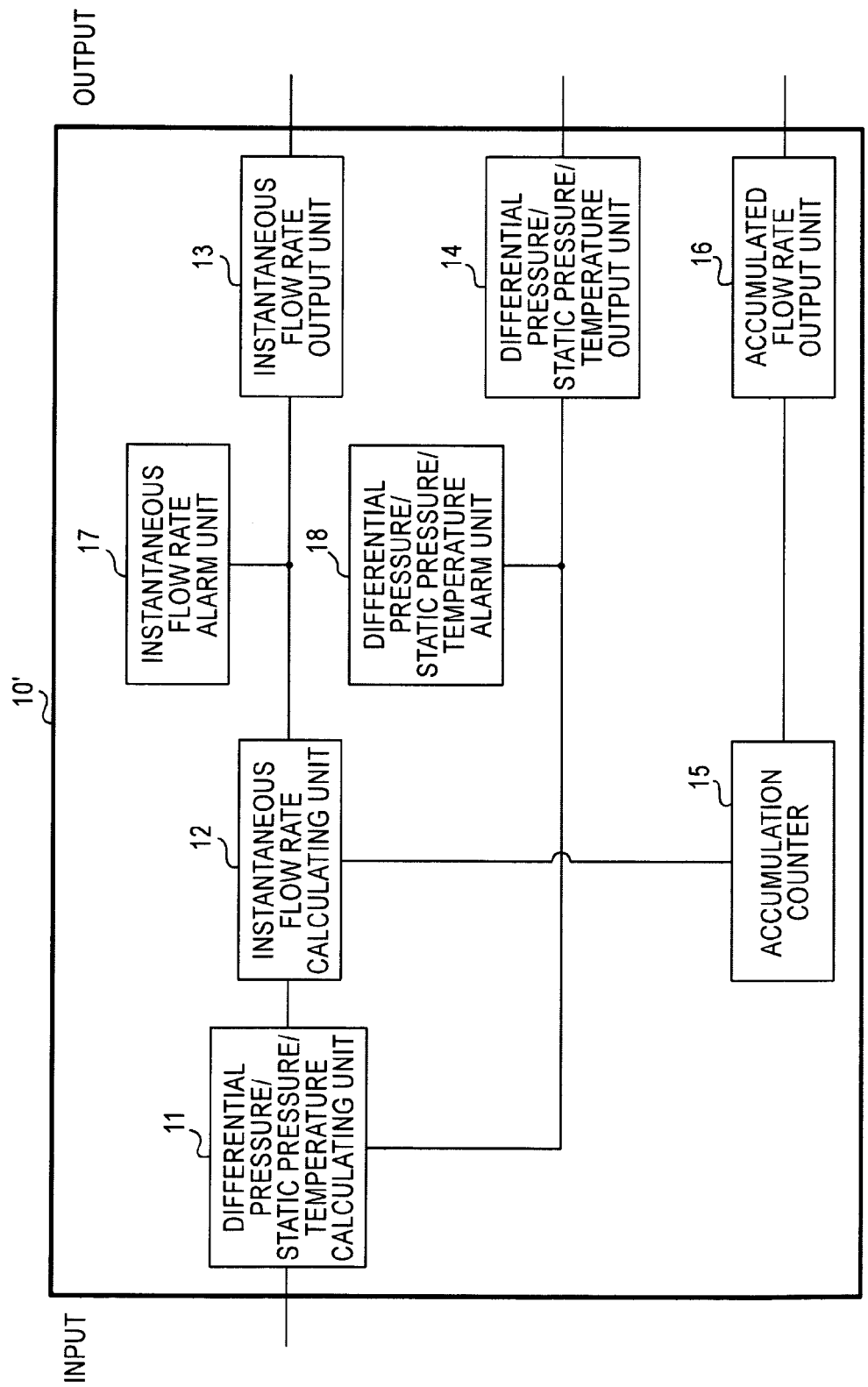
FIG. 3 is the structural diagram for indicating the conventional multi-variable mass/flow rate transfer device.

It should also be understood that in the conventional technical idea of FIG. 3, if the conventional multi-variable mass/flow rate transfer device 10' is set in such a manner that when an instantaneous flow rate exceeds ±10 [%] of the flow rate precision percentage as to a predictable instantaneous flow rate of a flow rate measuring subject, there are some possibilities that a value of an accumulated flow rate after a predetermined time has elapsed may produce an error of ±10 [%].

Further, in the embodiment of FIG. 1, both the flow rate precision percentage ±a [%] and the error ±B of the flow rate maybe alternatively set from an external communication setting tool (not shown). Precisely speaking, the external communication setting tool sets both the flow rate precision percentage ±a [%] and the error ±B of the flow rate via a two-wire transfer line (not shown) to the multi-variable mass/flow rate transfer device 10. Then, the multi-variable mass/flow rate transfer device 10 sets the accumulated flow rate S4 and the accumulated flow rate S5 based upon the set flow rate precision percentage ±a [%] and the set error ±B of the flow rate.

If the above-described setting operation is carried out, then the multi-variable mass/flow rate transfer device 10 can judge as to whether or not the accumulated flow rate of the instantaneous accumulated flow rate is appropriate, and also, can set the alarm of the accumulated flow rate in a simple manner.

The present invention is not limited only to the above-explained embodiment, but may cover a large number of changes and modifications without departing from the technical spirit and scope of the invention.

What is claimed is:

1. A multi-variable mass/flow rate transfer device comprising:
    a differential pressure/static pressure/temperature calculating unit for calculating a differential pressure value, a static pressure value and a temperature value in real time based upon a signal detected from a process;
    an instantaneous flow rate calculating unit for calculating an instantaneous flow rate based upon the differential pressure value, the static pressure value and the temperature value;
    an accumulation counter for accumulating the calculated instantaneous flow rate of the instantaneous flow rate calculating unit to produce an accumulated flow rate;
    an accumulated flow rate alarm unit for producing an alarm when the accumulated flow rate produced by the accumulation counter becomes a predetermined value, and
    wherein both an upper limit threshold value (S1) and a lower limit threshold value (S2) of the accumulated flow rate alarm unit satisfy the below-mentioned formulae with respect to the instantaneous flow rate (A), a flow rate precision percentage (±a [%]), an error (±B) of the accumulated flow rate and an elapsed time (t):

$$S1 = A \cdot t \cdot ((100+a)/100) + B,$$

$$S2 = A \cdot t \cdot ((100-a)/100) - B.$$

2. The multi-variable mass/flow rate transfer device according to claim 1, wherein
    the multi-variable mass/flow rate transfer device is employed in a food processing step.

3. The multi-variable mass/flow rate transfer device according to claim 1, wherein
    the multi-variable mass/flow rate transfer device is employed in a high performance industrial furnace.

4. The multi-variable mass/flow rate transfer device according to claim 1, wherein
    the multi-variable mass/flow rate transfer device is employed in clean room development.

5. The multi-variable mass/flow rate transfer device according to claim 1, wherein
    both the flow rate precision percentage (±a [%]) and the error (±B) of the accumulated flow rate are set by way of an external communication setting tool.

* * * * *